(12) United States Patent
Guillet et al.

(10) Patent No.: US 9,593,963 B2
(45) Date of Patent: Mar. 14, 2017

(54) METHOD AND A DEVICE FOR DETERMINING NAVIGATION PARAMETERS OF AN AIRCRAFT DURING A LANDING PHASE

(71) Applicants: Airbus Operations SAS, Toulouse (FR); Ecole Nationale de L'Aviation Civile (E.N.A.C.), Toulouse (FR)

(72) Inventors: Alain Guillet, Blagnac (FR); Jérémy Vezinet, Toulouse (FR); Anne-Christine Escher, Castanet Tolosan (FR); Christophe Macabiau, Montauban (FR)

(73) Assignees: Airbus Operations SAS (FR); Ecole Nationale de L'Aviation Civile (E.N.A.C.) (FR)

( * ) Notice: Subject to any disclaimer, the term of this patent is extended or adjusted under 35 U.S.C. 154(b) by 100 days.

(21) Appl. No.: 14/637,554

(22) Filed: Mar. 4, 2015

(65) Prior Publication Data

US 2015/0253150 A1 Sep. 10, 2015

(30) Foreign Application Priority Data

Mar. 7, 2014 (FR) ..................................... 14 51848

(51) Int. Cl.

| *G01C 23/00* | (2006.01) |
|---|---|
| *G01S 19/15* | (2010.01) |
| *G01C 21/16* | (2006.01) |
| *G08G 5/00* | (2006.01) |

(Continued)

(52) U.S. Cl.
CPC ......... *G01C 23/005* (2013.01); *G01C 21/165* (2013.01); *G01S 19/15* (2013.01); *G05D 1/0676* (2013.01); *G08G 5/0021* (2013.01); *G08G 5/025* (2013.01)

(58) Field of Classification Search
None
See application file for complete search history.

(56) References Cited

U.S. PATENT DOCUMENTS 6,028,624 A * 2/2000 Watkins ................. B64D 47/04
 348/117
6,157,876 A 12/2000 Tarleton, Jr. et al.
(Continued)

FOREIGN PATENT DOCUMENTS

EP 1 335 258 A1 8/2003

OTHER PUBLICATIONS

Search Report (FR 14 51848) dated Nov. 13, 2014.

*Primary Examiner* — Truc M Do
(74) *Attorney, Agent, or Firm* — Lerner, David, Littenberg, Krumholz & Mentlik, LLP (57) ABSTRACT

A device for determining navigation parameters of an aircraft during a landing phase includes a video system including at least one digital video camera arranged on the aircraft, the digital video camera being configured to generate on the aircraft current video data relating to at least one characteristic point on the Earth, whose coordinates are known, and a data processing unit including an extended Kalman filter and configured to determine the navigation parameters on the basis of current navigation data of the aircraft, arising from a satellite navigation system, current inertial data of the aircraft, as well as said video data.

6 Claims, 4 Drawing Sheets

(51) Int. Cl.
*G08G 5/02* (2006.01)
*G05D 1/06* (2006.01)

(56) References Cited

U.S. PATENT DOCUMENTS

| | | | |
|---|---|---|---|
| 6,405,975 B1* | 6/2002 | Sankrithi | B64F 1/002 244/1 R |
| 7,616,130 B2* | 11/2009 | Astruc | G01C 23/005 244/17.11 |
| 7,855,675 B2* | 12/2010 | Fouet | G08G 5/0021 342/33 |
| 2003/0225487 A1 | 12/2003 | Robert et al. | |
| 2005/0125142 A1 | 6/2005 | Yamane | |
| 2008/0269966 A1* | 10/2008 | Markiton | G01C 23/00 701/16 |
| 2010/0232639 A1* | 9/2010 | Ibrahim | G01S 5/163 382/100 |
| 2011/0142281 A1* | 6/2011 | He | G01C 23/00 382/103 |
| 2011/0282580 A1* | 11/2011 | Mohan | G01C 21/005 701/472 |
| 2012/0022784 A1* | 1/2012 | Louis | G01C 21/005 701/445 |
| 2013/0282208 A1* | 10/2013 | Mendez-Rodriguez | G01S 17/89 701/16 |
| 2014/0236398 A1* | 8/2014 | Zhang | G08G 5/025 701/4 |

* cited by examiner

METHOD AND A DEVICE FOR DETERMINING NAVIGATION PARAMETERS OF AN AIRCRAFT DURING A LANDING PHASE

BACKGROUND OF THE INVENTION

The present invention relates to a method and device for determining navigation parameters of an aircraft, in particular of a transport airplane, during a landing phase, which are intended to afford an aid to the navigation of the aircraft.

Within the framework of the present invention, the landing phase comprises the approach and/or the landing proper.

In a standard manner, a device for determining navigation parameters provides an estimation of navigation parameters of the aircraft, with the aid of baro-inertial data and GNSS data.

Within the framework of the present invention, the following is meant:
- by "baro-inertial" (or INS) data or measurements, parameter values, determined by a facility onboard the aircraft, for example an inertial reference and anemobarometric data system of ADIRS ("Air Data and Reference System") type, which combines both inertial data and barometric data; and
- by GNSS or GPS data or measurements (or navigation data), values of parameters provided by an onboard receiver, especially a GPS receiver, which is associated with a global satellite navigation system, in particular of GNSS ("Global Navigation Satellite System") type associated with a satellite positioning system, in particular of GPS ("Global Positioning System") type.

More particularly, the device for determining navigation parameters is intended to determine and to provide at least some of the following navigation parameters: aircraft position, velocity and attitude parameters, as well as other parameters relating to sensor errors, such as inertial sensor measurement errors, a GNSS receiver clock bias and offset, and GNSS pseudo-distance correlated measurement errors.

DESCRIPTION OF THE PRIOR ART

The integration of GNSS data with baro-inertial data arising from INS ("Inertial Navigation System") sensors is one of the main standard solutions for improving aircraft location in difficult environments, the use of measurements of inertial sensors (INS sensors) making it possible in particular to fill intervals between successive GNSS data.

In a standard manner, such a device carries out, generally, an estimation of the navigation parameters, with the aid of a Kalman filter in which the INS measurements and the GNSS measurements are integrated.

However, when fusing the INS measurements and the GNSS measurements, the temporal degradation of the precision of the drift of the INS system must be taken into account. This drift depends on the quality of the INS system. However, the choice of the INS system depends on a compromise between performance and cost. Thus, the drift may vary for example from 1 meter per minute to several hundred meters per minute according to the INS system, and the cost is also very different between diverse INS systems.

It may therefore be advantageous to be able to deploy a very precise and low-cost solution for determining navigation parameters.

SUMMARY OF THE INVENTION

The object of the present invention is to propose such a solution. It relates to a method for determining navigation parameters of an aircraft during a landing phase, said method comprising steps implemented in an automatic and repetitive manner and entailing:
- in a first step, determining on the aircraft at least:
  - first data corresponding to current navigation data of the aircraft, arising from a satellite navigation system; and
  - second data corresponding to current inertial data of the aircraft; and
- in a second step, computing the navigation parameters on the basis at least of said first and second data, with the aid of an extended Kalman filter.

According to the invention:
- the first step comprises, moreover, an operation entailing determining, on the aircraft, video data corresponding to current data relating to at least one characteristic point on the Earth, whose coordinates are known, said video data being generated by at least one digital video camera arranged on the aircraft and observing said characteristic point; and
- the second step is configured to compute the navigation parameters on the basis also of said video data, in addition to said first and second data.

Advantageously, for the implementation of the second step, the extended Kalman filter is configured and adapted to take into account the video data so as to compute the navigation parameters.

Thus, by virtue of the integration of the video data, it is possible to improve the performance (precision, integrity and availability) of the navigation parameters determined with the aid of the extended Kalman filter. In particular, it is thus possible to obtain precise navigation parameters able to be used on the aircraft to aid it with navigation during the landing phase (approach and/or landing), using for this purpose baro-inertial data obtained for example on the basis of a lower-cost INS system.

The video camera or cameras used for the implementation of the present invention may be:
- either one or more cameras already existing on the aircraft, this being the case especially on modern commercial airplanes;
- or one or more cameras dedicated to the implementation of the present invention.

Advantageously, in the first step of the method, the video data comprise the following angular measurements:
- a first measurement, at a focal point of the video camera, of a first angle between an axis of an aircraft frame and a projection on a vertical plane of a line of sight of the video camera, observing said characteristic point; and
- a second measurement, at a focal point of the video camera, of a second angle between the axis of the aircraft frame and a projection on a horizontal plane of the line of sight of the video camera, observing said characteristic point.

Furthermore, in an advantageous manner, the second step of the method takes into account an observation matrix comprising a first observation matrix relating to said first data and a second observation matrix relating to said video data, and said second observation matrix comprises the tangent of the first measurement and the tangent of the second measurement which are defined with respect to the following parameters:
- the latitude, the longitude and the height with respect to the ground of the aircraft; and
- the angles of roll, of pitch and of yaw of the aircraft.

Within the framework of the present invention, the characteristic point on the Earth which is used for the measurement of video data can represent any point which can be identified by the video camera (and located on the images taken by the video camera), and whose coordinates are known.

Preferably, this characteristic point corresponds to a particular point of a runway scheduled for a landing of the aircraft during the landing phase, and especially the threshold of the runway.

Moreover, advantageously, said navigation parameters comprise at least some of the following data:
a position parameter of the aircraft;
a velocity parameter of the aircraft;
an attitude parameter of the aircraft; and
at least one parameter relating to an error of at least one sensor.

The present invention also relates to a device for determining navigation parameters of an aircraft during a landing phase.

Said device of the type comprising:
a first data generating unit, configured to determine first data corresponding to current navigation data of the aircraft, arising from a satellite navigation system;
a second data generating unit, configured to determine second data corresponding to current inertial data of the aircraft; and
a data processing unit comprising an extended Kalman filter and configured to determine the navigation parameters on the basis at least of said first and second data,
is noteworthy, according to the invention, in that said device comprises, moreover, a video system comprising at least one digital video camera arranged on the aircraft, the digital video camera being configured to generate on the aircraft current video data relating to at least one characteristic point on the Earth, whose coordinates are known, and in that the data processing unit is configured to determine the navigation parameters on the basis also of said video data.

In a particular embodiment, said device also comprises user means of navigation parameters determined by the data processing unit.

The present invention also relates to an aircraft navigation system, which comprises the aforementioned device.

The present invention relates, furthermore, to an aircraft, in particular a transport airplane, which comprises a navigation device and/or system, such as those aforementioned.

BRIEF DESCRIPTION OF THE DRAWINGS

The appended figures will elucidate the manner in which the invention may be embodied. In these figures, identical references designate similar elements.

DESCRIPTION OF THE PREFERRED EMBODIMENTS

Figure 1:
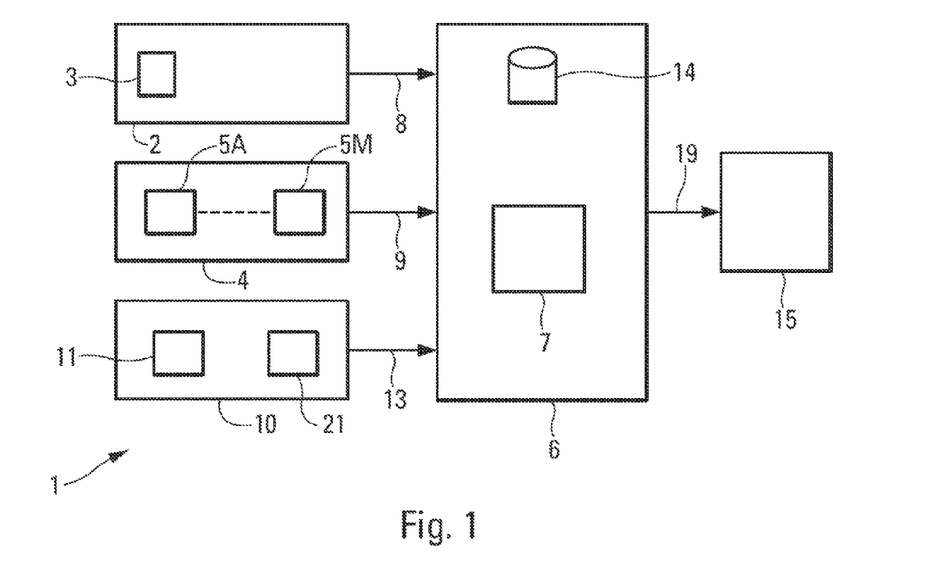
FIG. 1 is the schematic diagram of a particular embodiment of a device in accordance with the invention.

The device 1 illustrating the invention and represented schematically in FIG. 1 is intended to determine navigation parameters of an aircraft AC (FIG. 2), in particular of a transport airplane, during a landing phase (approach and/or landing proper) of the aircraft AC on a landing runway of an airport.

Said device 1 which is onboard the aircraft AC comprises, in a standard manner:

a data generating unit 2 which comprises at least one standard receiver 3 (preferably a GPS receiver) which is associated with a global satellite navigation system, in particular of GNSS ("Global Navigation Satellite System") type, associated with a satellite positioning system, especially of GPS ("Global Positioning System") type. The data generating unit 2 is configured to determine, in a standard manner, first data corresponding to current navigation data (or GPS or GNSS data) of the aircraft AC (on the basis of the information received by the receiver 3 associated with the satellite navigation system);

a data generating unit 4, for example an inertial reference and anemobarometric data system of ADIRS ("Air Data and Reference System") type, which combines both inertial data and barometric data. The data generating unit 4 comprises a plurality of standard inertial sensors 5A to 5M (INS sensors), M being an integer, and is configured to determine, in a standard manner, second data corresponding to current inertial data (or baro-inertial or INS data) of the aircraft AC; and a data processing unit 6 which comprises an extended Kalman filter 7 and which is connected by way of links 8 and 9, respectively, to said units 2 and 4. The data processing unit 6 is configured to determine the navigation parameters, on the basis at least of said first and second data received from the units 2 and 4 via the links 8 and 9.

According to the invention, said device 1 comprises, moreover, a video system 10 comprising at least one digital video camera 11 which is arranged on the aircraft.

The video camera 11 is arranged on the aircraft AC in such a way as to take video images of the outside environment in front of the aircraft AC.

This video camera 11 is configured to generate on the aircraft AC current video data relating to at least one characteristic point 12 on the Earth T, whose coordinates are known. Accordingly, the device 1 can comprise a database 14 which contains the coordinates (longitude and latitude especially) of said characteristic point 12 and which is, for example, integrated into the data processing unit 6.

This characteristic point 12 (or target point) can be any point which can be identified by the video camera 11 (and located on the video images taken by the video camera 11), and whose coordinates are known. Preferably, this characteristic point 12 corresponds to a particular point of a runway scheduled for a landing during the landing phase, and especially the threshold of the runway.

The video system 10 also comprises a standard unit 21 for processing video data, which processes the data generated by the video camera 11 and which provides the video data specified hereinbelow.

Moreover, according to the invention, the data processing unit 6 is configured to determine the navigation parameters on the basis also of the video data generated by the video system 10 and received by way of a link 13, as specified hereinbelow, in addition to the first and second aforementioned data.

Accordingly, the extended Kalman filter 7 of the data processing unit 6 is configured and adapted to take into account the video data so as to compute the navigation parameters, as specified hereinbelow.

Thus, by virtue of the integration of the video data, the device 1 is able to improve the performance (precision, integrity and availability) of the navigation parameters determined with the aid of the extended Kalman filter 7. In particular, the device 1 thus makes it possible to obtain precise navigation parameters, able to be used on the aircraft AC to aid it with navigation during the landing phase, using for this purpose baro-inertial data obtained for example on the basis of a lower-cost unit 4.

The video system 10 used for the implementation of the present invention can comprise:

either one or more cameras already installed on the aircraft, this being the case especially on modern commercial airplanes;

or one or more cameras dedicated to the implementation of the present invention and installed specifically with this aim.

In a particular embodiment, said device 1 also comprises a set 15 of user means onboard the aircraft AC, for example display systems and/or computers in the cockpit, for command of control surfaces of the aircraft AC (flight controls) or else for guidance of the aircraft AC (automatic pilot), which use the navigation parameters determined by the data processing unit 6 (and received via a link 19).

The present invention also relates to a navigation system of the aircraft AC, which comprises said device 1 and which is charged with the navigation of the aircraft AC especially during the landing phase.

The data processing unit 6 comprises an extended Kalman filter 7 with an error state vector which estimates errors of the position, velocity and attitude parameters, as well as other parameters relating to sensor errors, such as inertial sensor (sensors 5A to 5M) measurement errors, a clock bias and offset of a receiver 3 of GNSS type, and GNSS pseudo-distance correlated measurement errors.

In the following description of the invention, the following parameters are considered:

$\omega_{a/b}^a$: an instantaneous vector of rotation of an A frame with respect to a B frame, such as are specified hereinafter, which is expressed in the coordinate system of the A frame;

$\Omega_{a/b}^a$: the associated symmetric matrix (of "skew" type), also denoted $\omega_{a/b}^a \Lambda$ $R_{a2b}$: a rotation matrix for transforming vectors from the coordinate system of the A frame, to the coordinate system of the B frame; and $v_e^a$ and $f_{a/b}^a$: respectively a speed of the aircraft AC relative to the Earth, expressed in the coordinate system of the A frame, and a specific force vector of the A frame with respect to the B frame, expressed in the coordinate system of the A frame.

Figure 2:
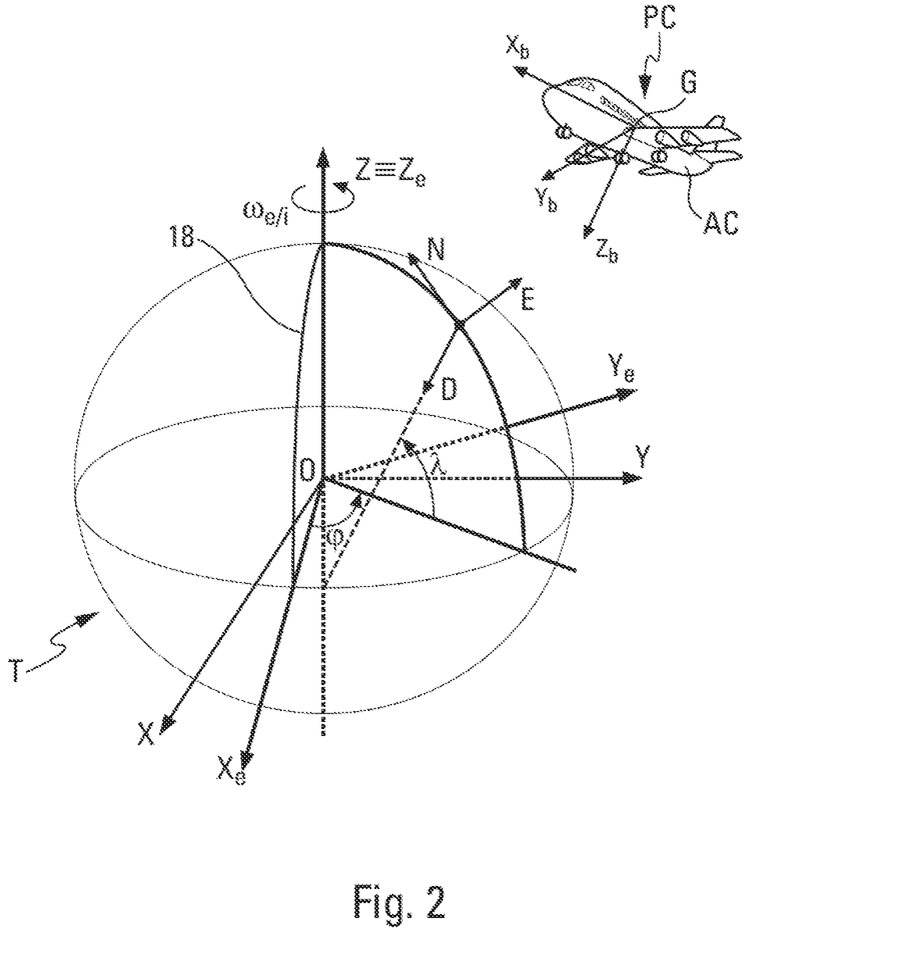
FIGS. 2 to 5 are schematic representations making it possible to explain the relations between various parameters and frames used during the implementation of the present invention.

Moreover, some of the frames used in the implementation of the invention have been represented in FIG. 2 (which shows very schematically a current position PC of the aircraft AC with respect to the Earth T). More precisely, the frames involved in the implementation of the invention are the following:

A/(X,Y,Z) is an inertial frame (or I frame). It is defined as a reference frame, in which Newton's laws of motion apply. The origin O of the inertial frame coincides with the center of mass of the Earth T. The X axis is directed toward the vernal point (or "vernal equinox"), the Z axis is directed along the rotation axis of the Earth T, and the Y axis is defined so as to complete the right-handed coordinate system;

B/($X_e,Y_e,Z_e$) is a frame termed E (or ECEF frame for "Earth-Centered Earth-Fixed frame"). Its origin O is fixed at the center of the Earth T. The axis $Z_e$ is aligned with the Z axis of the inertial frame. The ECEF frame rotates with respect to the inertial frame at a frequency of:

$\omega_{e/i} \approx 7{,}292115 \cdot 10^{-5}$ rad/s

In the ECEF frame, two coordinate systems can be used: the rectangular ECEF coordinate system (X,Y,Z); and the geodesic ECEF coordinate system which introduces the latitude, longitude and altitude parameters ($\lambda,\phi,h$).

The relation between the two sets of coordinates is as follows:

$X=(R_E+h)\cdot\cos\lambda\cdot\cos\phi$ $Y=(R_E+h)\cdot\cos\lambda\cdot\sin\phi$ $Z=((1-e^2)\cdot R_E+h)\cdot\sin\lambda$ where e=0.0818 is the eccentricity and $R_E$ is the terrestrial radius;

C/(N,E,D) is a geographical navigation frame (NED frame or N frame) which is defined locally with respect to the geoid of the Earth T. The axis $Z_n$(D) is directed toward the interior of the ellipsoid along the normal to the ellipsoid. The axis $X_n$(N) is directed northward, and the axis $Y_n$(E) is directed eastward to complete the right-handed coordinate system. The origin of the frame is the projection of the origin of the platform on the geoid of the Earth T.

The inertial rotation rate of the Earth T, expressed in the N frame, is:

$$\omega_{e/i}^n = \begin{bmatrix} \omega_{e/i}\cdot\cos(\lambda) \\ 0 \\ -\omega_{e/i}\cdot\sin(\lambda) \end{bmatrix}$$

D/($X_b,Y_b,Z_b$) is a body or moving object frame (B frame or M frame) which is tied rigidly to the vehicle considered, in this instance to the aircraft AC, usually to a fixed point such as its center of gravity G (FIG. 2). This frame is also called the aircraft frame hereinafter. The axis $X_b$ is defined in the direction of progress, the axis $Z_b$ is defined to point downwards from the vehicle (aircraft AC), and the axis $Y_b$ is defined to point toward the right of the vehicle (aircraft AC) so as to complete the right-handed coordinate system, as represented in FIG. 2;

E/($X_p,Y_p,Z_p$) is a platform frame (P frame) which is considered to be aligned with the body frame (aircraft frame); and F/($X_w,Y_w,Z_w$) is an azimuth reference frame termed "Wander" (W frame) which solves the high-latitude problem encountered by the geographical frame. The definition is expressed in terms of angular velocity of the frame with respect to the Earth frame. Thus, if the vector of instantaneous rotation of the N frame with respect to the E frame, expressed in the N frame, is:

$$\omega_{n/e}^2 = \begin{bmatrix} \dot\phi\cdot\cos(\lambda) \\ -\dot\lambda \\ -\dot\phi\cdot\sin(\lambda) \end{bmatrix}$$

then the vector of instantaneous rotation of the W frame with respect to the E frame, expressed in the N frame, is:

$$\omega_{w/e}^2 = \begin{bmatrix} \dot\phi\cdot\cos(\lambda) \\ -\dot\lambda \\ 0 \end{bmatrix}$$

The data received and used by the data processing unit 6 of the device 1 are now specified.

Firstly, in a standard manner, the unit 2 provides the data processing unit 6, via the link 8, with measurements of pseudo-distances as current navigation data.

Secondly, the unit 4 provides (via the link 9) the following data as current inertial data:

$\tilde{f}_{m/i}^{m}=[\tilde{f}_x,\tilde{f}_y,\tilde{f}_z]$: a measurement of the specific force of the aircraft AC with respect to the inertial frame, expressed in the aircraft frame (or moving frame);

$\tilde{\omega}_{m/i}^{m}=[\tilde{\omega}_x,\tilde{\omega}_y,\tilde{\omega}_z]$: a measurement of the rotation speed of the aircraft AC with respect to the inertial frame, expressed in the aircraft frame;

an estimation of the latitude $\hat{\lambda}$, the longitude $\hat{\phi}$ and the baro-inertial altitude $\hat{h}_B$ of the aircraft AC;

$\hat{v}_e^{n}=[\hat{v}_N,\hat{v}_E,\hat{v}_D]$: an estimation of the velocity of the aircraft AC with respect to the Earth, expressed in the NED frame (or N frame);

$\hat{\rho}_{m/n}^{n}=[\hat{\phi},\hat{\theta},\hat{\Psi}]$: an estimation of the angles of roll, of pitch and of yaw of the aircraft AC with respect to the N frame, expressed in the aircraft frame;

$\hat{w}$: an estimation of the angle of azimuth of "Wander" type which defines the angle between the North axis of the N frame and the axis $X_w$ of the W frame; and $\hat{R}_{m2n}$: an estimation of the rotation matrix for rotating from the aircraft frame to the N frame.

Figure 3:
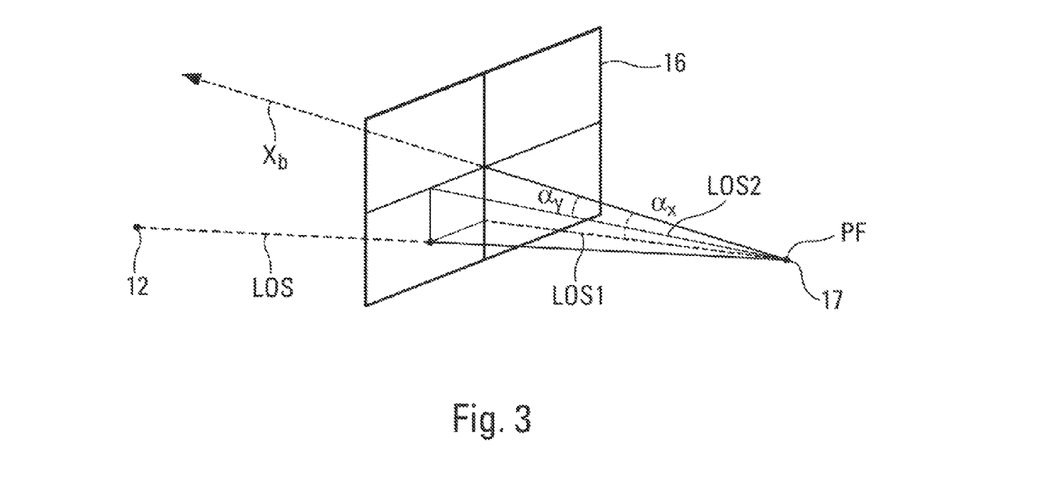

Thirdly, the video system 10 detects from the aircraft AC one or more characteristic points 12 of the exterior environment, and especially of the environment of the runway scheduled for the landing, and it provides, for each characteristic considered, the following data, as represented in FIG. 3 (illustrating a field of vision 16 of the video camera 11 of the video system 10):

a first measurement $\tilde{\alpha}_x$, at a focal point 17 of the video camera 11, of a first angle $\alpha_x$ between the axis $X_b$ of the aircraft frame and a projection LOS1 on a vertical plane (containing the axis $X_b$) of a line of sight LOS of the video camera 11 which observes said characteristic point 12 (that is to say whose field of vision comprises said characteristic point 12). The line of sight LOS connects the points 12 and 17; and a second measurement $\tilde{\alpha}_y$, at said focal point 17 of the video camera 11, of a second angle $\alpha_y$ between the axis $X_b$ of the aircraft frame and a projection LOS2 on a horizontal plane (containing the axis $X_b$) of the line of sight LOS of the video camera 11 which observes said characteristic point 12.

The data processing unit 6 uses the previous data to determine the navigation parameters with the aid of the extended Kalman filter 7.

The processing operations implemented by the extended Kalman filter 7 are presented hereinafter while specifying firstly the use of the baro-inertial data and navigation data (GPS data) before specifying the use of the video data.

Moreover, in the description hereinbelow:

for an estimated parameter, the difference between the true value x of the parameter and the estimated value $\hat{x}$ is denoted: $\delta_x$; and for a measured parameter, the difference between the true value x of the parameter and the measured value $\tilde{x}$ is denoted: $\delta_x$ The radius of curvature $R_M$ of the Earth T along a meridian 18 (FIG. 2) and the radius $R_N$ normal to the meridian 18 are defined by:

$$R_M=(a\cdot(1-e^2))/(1-e^2\cdot\sin^2\lambda)^{3/2}$$

$$R_N=a/(1-e^2\cdot\sin^2\lambda)^{1/2}$$

where a is the semi-major axis of the terrestrial ellipsoid.

The radii of curvature in the directions $X_w$ and $Y_w$ of the W frame are:

$$1/(R_x+h_B)=\cos^2 w/(R_N+h_B)+\sin^2 w/(R_M+h_B)$$

$$1/(R_y+h_B)=\cos^2 w/(R_M+h_B)+\sin^2 w/(R_N+h_B)$$

$$1/(R_{xy}+h_B)=\cos w\cdot\sin w\cdot(1/(R_N+h_B)-1/(R_M+h_B))$$

Moreover, the components of the error state vector $\delta X$ for the processing of the extended Kalman filter 7 (implemented by the data processing unit 6) are, successively, as follows:

$d\theta_x$, $d\theta_y$: the errors of horizontal angular position in the W frame;

$dh_B$: the baro-inertial altitude error;

$da_B$: the output of a compensator of the third-order baro-inertial loop slaving loop;

$dV_x$, $dV_y$: the errors of horizontal velocity in the W frame;

$dV_z$: the baro-inertial vertical speed (along the downward vertical axis);

$d\phi_x$, $d\phi_y$, $d\phi_z$: the errors of angles of alignment in the W frame;

$bg_x$, $bg_y$, $bg_z$: the gyroscopic bias errors in the aircraft frame;

$ba_x$, $ba_y$, $ba_z$: the accelerometric bias errors in the aircraft frame;

$b_H$: the clock bias error of the GPS receiver (receiver 3);

$d_H$: the clock drift error of the GPS receiver (receiver 3); and $err_{GNSS1}, \ldots, err_{GNSSN}$: the correlated errors of GPS pseudo-distances (for N satellites).

The propagation matrix is specified first.

For this purpose, firstly, the horizontal angular position error transition matrix, is:

$$F_{pos}=\begin{bmatrix} 1/(R_{xy}+h_B) & 1/(R_y+h_B) & \ldots & 0 & 0 \\ -1/(R_x+h_B) & 1/(R_{xy}+h_B) & \ldots & 0 & 0 \end{bmatrix}$$

Secondly, concerning the baro-inertial altitude error transition matrix, the equations of the baro-inertial altitude error model are:

$$\delta\dot{h}_B=-\delta V_Z-K_1\cdot(\delta h_B-\delta h_{baro})$$

$$\delta\dot{a}_B=K_3\cdot(\delta h_B-\delta h_{baro})$$

where K1, K2, and K3 are the gains of a third-order baro-inertial loop.

The transition state matrix is then:

$$F_{baro}=\begin{bmatrix} 0 & 0 & -K_1 & 0 & 0 & -1 & 0 & \ldots & 0 \\ 0 & 0 & 0 & K_3 & 0 & 0 & 0 & \ldots & 0 \end{bmatrix}$$

The complete 3D position error transition matrix is thus:

$$F_{3Dpos}=\begin{bmatrix} F_{pos} \\ F_{baro} \end{bmatrix}$$

Thirdly, concerning the horizontal velocity error transition matrix, the equation for the INS horizontal velocity error in the W frame is derived from that for the navigation frame, specified subsequently:

$$\delta\dot{v}_e^w=\delta f_{m/i}^w+(-\tilde{f}_{m/i}^w\Lambda)\cdot\rho+\delta g^w+(\hat{v}_e^w\Lambda)\cdot(\delta\omega_{w/e}^w+2\delta\omega_{e/i}^w)-(\hat{\Omega}_{w/e}^w+2\hat{\Omega}_{e/i}^w)\cdot\delta v_e^w$$

The gravity error vector is:

$$\delta g^n = \delta g^w = \begin{bmatrix} 0 & 0 & 0 \\ 0 & 0 & 0 \\ 0 & 0 & -2g_0/R_E \end{bmatrix} \cdot \begin{bmatrix} \lambda \\ \phi \\ h \end{bmatrix} + \begin{bmatrix} e_N \\ e_E \\ e_D \end{bmatrix} \begin{bmatrix} e_N \\ e_E \\ e_D \end{bmatrix}$$

is the gravity model error, and $g_0$ is the gravitational constant. The gravity model error is not modeled in the state vector. These errors are integrated into the velocity state noise vector.

For the equation for the horizontal velocity error, the first two rows of the gravity error are negligible:

$$F_{velo/baro}=0$$

The computation of $\delta\omega_{w/e}^w + 2\delta\omega_{e/i}^w$ is carried out with the aid of the expression for the partial derivatives. For this purpose, it is necessary to firstly compute the following partial derivatives:

$$\delta\omega_{w/e}^w = [(\partial\omega_{w/e}^w((\theta_x,\theta_y,h),v_e^w)/\partial(\theta_x,\theta_y,h), \partial\omega_{w/e}^w((\theta_x,\theta_y,h),v_e^w)/\partial v_e^w] \cdot \begin{bmatrix} \delta(\theta_x,\theta_y,h) \\ \delta v_e^w \end{bmatrix}$$

$$\delta\omega_{e/i}^w = [(\partial\omega_{e/i}^w((\theta_x,\theta_y,h),v_e^w)/\partial(\theta_x,\theta_y,h), \partial\omega_{e/i}^w((\theta_x,\theta_y,h),v_e^w)/\partial v_e^w] \cdot \begin{bmatrix} \delta(\theta_x,\theta_y,h) \\ \delta v_e^w \end{bmatrix}$$

The rotation of the W frame with respect to the E frame and the rotation of the E frame with respect to the I frame, both expressed in the W frame, are:

$$\omega_{w/e}^\omega R_{n2w} \cdot \omega_{w/e}^n = \begin{bmatrix} \cos w & \sin w & 0 \\ -\sin w & \cos w & 0 \\ 0 & 0 & 1 \end{bmatrix} \cdot \begin{bmatrix} V_E/(R_N+h) \\ -V_N/(R_M+h) \\ 0 \end{bmatrix}$$

$$\omega_{e/i}^w = R_{n2w} \cdot \omega_{w/e}^n = \begin{bmatrix} \cos w & \sin w & 0 \\ -\sin w & \cos w & 0 \\ 0 & 0 & 1 \end{bmatrix} \cdot \begin{bmatrix} w_{e/i}\cos\lambda \\ 0 \\ -w_{e/i}\sin\lambda \end{bmatrix}$$

$$\partial\omega_{e/i}^w / \partial v_e^w = [0]$$

$$F_{velo/pos1} = (\partial\omega_{w/e}^w/\partial(\theta_x,\theta_y,h)) + 2 \cdot (\partial\omega_{e/i}^w/\partial(\theta_x,\theta_y,h))$$

$$F_{velo/velo1} = (\partial\omega_{w/e}^w/\partial v_e^w) + 2 \cdot (\partial\omega_{e/i}^w/\partial v_e^w)$$

$$F_{velo/velo2} = \omega_{w/e}^w \Lambda + 2\omega_{e/i}^w \Lambda$$

$$F_{velo/att} = -(\hat{R}_{m2w} \cdot \bar{f}_{m/i}^m)\Lambda$$

$$F_{velo/bg} = 0$$

$$F_{velo/ba} = \hat{R}_{m2w}$$

The horizontal velocity error dynamic matrix $F_{veloINS}$ then comprises the following successive parameters:

$$F_{velo/pos} = (\hat{v}_e^w \Lambda) \cdot F_{velo/pos1}$$

$$F_{velo/baro} = 0_{3\times 2}$$

$$F_{velo/velo} = (\hat{v}_e^w \Lambda) \cdot F_{velo/velo1} - F_{velo/velo2}$$

$$F_{velo/att} = (-\bar{f}^w \Lambda)$$

$$F_{velo/bg} = 0_{3\times 3}$$

$$F_{velo/ba} = \tilde{R}_{m2w}$$

The final horizontal velocity error dynamic matrix $F_{horizvelo}$ is composed of the first two rows of the matrix $F_{veloINS}$. The baro-inertial vertical speed error transition matrix is computed hereinafter.

Fourthly, concerning the baro-inertial vertical speed error transition matrix, the equation for the model of baro-inertial vertical speed error is:

$$\delta\dot{V}_z = \delta f_{corr}^z - 2 \cdot g_0 \cdot \delta h_B/R_E + \delta a_B + K_2 \cdot (\delta h_B - \delta h_{baro})$$

with $f_{corr}^z$ the specific vertical force of the aircraft AC with inertial corrections.

The transition state matrix is then:

$$F_{baro\ speed} = \begin{bmatrix} 0 & 0 & \left(K_2 - \dfrac{2g_0}{R_E}\right) & 1 & 0_{1\times 18} & 1 & 0 & \ldots & 0 \end{bmatrix}$$

The complete 3D velocity error transition matrix is:

$$F_{3Dvelo} = \begin{bmatrix} F_{hori\ velo} \\ F_{baro\ speed} \end{bmatrix}$$

Fifthly, concerning the attitude error transition matrix, the INS attitude error equation in the W frame, is as follows:

$$\dot{\rho} = -\hat{\Omega}_{w/i}^w \cdot \rho + \hat{R}_{m2w} \cdot \delta\omega_{m/i}^m - \delta\omega_{w/i}^w$$

The computation of $\delta\omega_{w/i}^w$ and of $\hat{\Omega}_{w/i}^w$ is defined on the basis of the corresponding equations indicated hereinbelow:

$$\omega_{w/i}^w = \omega_{w/e}^w + \omega_{e/i}^w$$

$$F_{att/pos} = -((\partial\omega_{w/e}^w/\partial(\theta_x,\theta_y,h)) + (\partial\omega_{e/i}^w/\partial(\theta_x,\theta_y,h)))$$

$$F_{att/velo} = -((\partial\omega_{w/e}^w/\partial v_e^w) + (\partial\omega_{e/i}^w/\partial v_e^w))$$

$$F_{att/att} = (-\omega_{w/i}^w \Lambda)$$

$$F_{att/bg} = \hat{R}_{m2w}$$

$$F_{att/ba} = 0$$

The attitude dynamic matrix may be then written:

$$F_{att} = [F_{att/pos}\ F_{att/velo}\ F_{att/att}\ F_{att/bg}\ F_{att/ba}]$$

And the INS dynamic matrix is:

$$F_{INS} = \begin{bmatrix} F_{3Dpos} \\ F_{3Dvelo} \\ F_{att} \end{bmatrix}$$

Moreover, sixthly, the discrete matrix of transition of measurements of the sensors is:

$$F_{biases} = \begin{bmatrix} e^{-\frac{\Delta t}{\tau_{gyro}}} & 0 & 0 & 0 & 0 & 0 \\ 0 & e^{-\frac{\Delta t}{\tau_{gyro}}} & 0 & 0 & 0 & 0 \\ 0 & 0 & e^{-\frac{\Delta t}{\tau_{gyro}}} & 0 & 0 & 0 \\ 0 & 0 & 0 & e^{-\frac{\Delta t}{\tau_{accel}}} & 0 & 0 \\ 0 & 0 & 0 & 0 & e^{-\frac{\Delta t}{\tau_{accel}}} & 0 \\ 0 & 0 & 0 & 0 & 0 & e^{-\frac{\Delta t}{\tau_{accel}}} \end{bmatrix}$$

Moreover, seventhly, concerning the drift and the bias of the clock of the GPS receiver (receiver 3), the transition processing of the clock drift and bias is:

$$\begin{bmatrix} b_H \\ \dot{d}_H \end{bmatrix} = \begin{bmatrix} 0 & 1 \\ 0 & 0 \end{bmatrix} \cdot \begin{bmatrix} b_H \\ d_H \end{bmatrix} + \begin{bmatrix} n_\phi \\ n_f \end{bmatrix}$$

The clock drift and bias transition matrix $F_{clock}$ is:

$$F_{clock} = \begin{bmatrix} 0 & 1 \\ 0 & 0 \end{bmatrix}$$

Moreover, eighthly, concerning the correlated errors of GPS pseudo-distances, the discrete transition matrix $Ferr_{GPS}$ for the correlated errors of pseudo-distances is:

$$Ferr_{GPS} = \begin{bmatrix} e^{-\Delta t/\tau err_{GPS}} & 0 & 0 \\ 0 & \ldots & 0 \\ 0 & 0 & e^{-\Delta t/\tau err_{GPS}} \end{bmatrix}$$

The final GPS dynamic matrix $F_{GPS}$ is then:

$$F_{GPS} = \begin{bmatrix} F_{clock} & 0 \\ 0 & Ferr_{GPS} \end{bmatrix}$$

And the global dynamic matrix is:

$$F = \begin{bmatrix} F_{INS\backslash IMU} & 0 \\ 0 & F_{GPS} \end{bmatrix}$$

The state noise covariance matrix relating to the extended Kalman filter 7 is now defined.

Firstly, the INS and IMU state noise covariance matrix is:

$$q_{INS/IMU} = \begin{bmatrix} q_{\theta_x} & 0 & 0 & 0 & 0 & 0 & 0 & 0 & 0 & 0 & 0 & 0 & 0 & 0 & 0 \\ 0 & q_{\theta_y} & 0 & 0 & 0 & 0 & 0 & 0 & 0 & 0 & 0 & 0 & 0 & 0 & 0 \\ 0 & 0 & q_{h_B} & 0 & 0 & 0 & 0 & 0 & 0 & 0 & 0 & 0 & 0 & 0 & 0 \\ 0 & 0 & 0 & q_{V_x} & 0 & 0 & 0 & 0 & 0 & 0 & 0 & 0 & 0 & 0 & 0 \\ 0 & 0 & 0 & 0 & q_{V_y} & 0 & 0 & 0 & 0 & 0 & 0 & 0 & 0 & 0 & 0 \\ 0 & 0 & 0 & 0 & 0 & q_{V_z} & 0 & 0 & 0 & 0 & 0 & 0 & 0 & 0 & 0 \\ 0 & 0 & 0 & 0 & 0 & 0 & q_{\phi_x} & 0 & 0 & 0 & 0 & 0 & 0 & 0 & 0 \\ 0 & 0 & 0 & 0 & 0 & 0 & 0 & q_{\phi_y} & 0 & 0 & 0 & 0 & 0 & 0 & 0 \\ 0 & 0 & 0 & 0 & 0 & 0 & 0 & 0 & q_{\phi_z} & 0 & 0 & 0 & 0 & 0 & 0 \\ 0 & 0 & 0 & 0 & 0 & 0 & 0 & 0 & 0 & q_{bg_x} & 0 & 0 & 0 & 0 & 0 \\ 0 & 0 & 0 & 0 & 0 & 0 & 0 & 0 & 0 & 0 & q_{bg_y} & 0 & 0 & 0 & 0 \\ 0 & 0 & 0 & 0 & 0 & 0 & 0 & 0 & 0 & 0 & 0 & q_{bg_z} & 0 & 0 & 0 \\ 0 & 0 & 0 & 0 & 0 & 0 & 0 & 0 & 0 & 0 & 0 & 0 & q_{ba_x} & 0 & 0 \\ 0 & 0 & 0 & 0 & 0 & 0 & 0 & 0 & 0 & 0 & 0 & 0 & 0 & q_{ba_y} & 0 \\ 0 & 0 & 0 & 0 & 0 & 0 & 0 & 0 & 0 & 0 & 0 & 0 & 0 & 0 & q_{ba_z} \end{bmatrix}$$

The diagonal components reflect the dynamics of the evolution of the inertial error state such as adapted for the inertial classes.

Secondly, the GPS state noise covariance function is:

$$q_{GPS} = \begin{bmatrix} \sigma_\phi & 0 & 0 & 0 & 0 \\ 0 & \sigma_f & 0 & 0 & 0 \\ 0 & 0 & \sigma_{errGPS1} & 0 & 0 \\ 0 & 0 & 0 & \ddots & 0 \\ 0 & 0 & 0 & 0 & \sigma_{errGPS2} \end{bmatrix}$$

The diagonal components reflect the dynamics of the evolution of the inertial error state such as adapted for the type of receiver.

The global state noise covariance matrix is thus:

$$q = \begin{bmatrix} q_{INS/IMU} & 0 \\ 0 & q_{GPS} \end{bmatrix}$$

The observation matrix relating to the extended Kalman filter 7 is now defined.

Concerning the observation matrix, firstly, the GPS pseudo-distance observation function is:

$$h^i_{GPS}(x(k)) = \rho^i(k) + c \cdot b^i_H(k)$$

$$\rho^{i(k)} = \sqrt{(X^i(k) - X(k))^2 + (Y^i(k) - Y(k))^2 + (Z^i(k) - Z(k))^2}$$

with:
(X,Y,Z) the coordinates of the position estimated by an INS sensor (sensor 5A, 5M) in the E frame; and
($X^i, Y^i, Z^i$) the coordinates of the position of the ith satellite in the E frame.

The linear observation matrix $H_{GPS}$ is then:

$$H^i_{GPS} = \begin{bmatrix} \dfrac{\partial h^i}{\partial \theta_x} & \dfrac{\partial h^i}{\partial \theta_y} & \dfrac{\partial h^i}{\partial h_B} & 0 & \ldots & 0 & \dfrac{\partial h^i}{\partial b_H} & 0 & 0 & \ldots & 0 \end{bmatrix}$$

-continued $$\frac{\partial h^i}{\partial(\theta_x, \theta_y, h_B)} = \frac{\partial \rho^i}{\partial(X, Y, Z)} \times \frac{\partial(X, Y, Z)}{\partial(\lambda, \phi, h_B)} \times \frac{\partial(\lambda, \phi, h_B)}{\partial(\theta_x, \theta_y, h_B)}$$

$$\frac{\partial \rho^i}{\partial(X, Y, Z)} = \left[ \frac{X^i - X}{\rho^i} \quad \frac{Y^i - Y}{\rho^i} \quad \frac{Z^i - Z}{\rho^i} \right]$$

$$\frac{\partial(X, Y, Z)}{\partial(\lambda, \phi, h_B)} =$$

$$\begin{bmatrix} -(R_E + h_B) \cdot \sin\lambda \cdot \cos\phi & -(R_E + h_B) \cdot \cos\lambda \cdot \sin\phi & \cos\lambda \cdot \cos\phi \\ -(R_E + h_B) \cdot \sin\lambda \cdot \sin\phi & (R_E + h_B) \cdot \cos\lambda \cdot \cos\phi & \cos\lambda \cdot \sin\phi \\ ((1 - e^2) \cdot R_E + h_B) \cdot \cos\lambda & 0 & \sin\lambda \end{bmatrix}$$

$$\frac{\partial(\lambda, \phi, h_B)}{\partial(\theta_x, \theta_y, h_B)} = \begin{bmatrix} -\sin w & -\cos w & 0 \\ \frac{\cos w}{\cos\lambda} & -\frac{\sin w}{\cos\lambda} & 0 \\ 0 & 0 & 1 \end{bmatrix}$$

Moreover, secondly, concerning the observation matrix for the video measurements generated by the video system 10, the observation matrix for optical angular measurements is:

$$h^i_{video}(x(k)) = \tan\left(\begin{bmatrix} \alpha_x \\ \alpha_y \end{bmatrix}\right)$$

$$\tan(\alpha_x) = h_1(\lambda, \phi, h_B, \varphi, \theta, \psi)$$

$$\tan(\alpha_y) = h_2(\lambda, \phi, h_B, \varphi, \theta, \psi)$$

The optical angular measurements are defined with respect to ω:

$$\tan(\alpha_x) = f_x(\lambda,\phi,h_B,\theta) \cdot \cos\phi + f_y(\lambda,\phi,h_B,\Psi) \cdot \sin\phi$$

$$\tan(\alpha_y) = -f_x(\lambda,\phi,h_B,\theta) \cdot \sin\phi + f_y(\lambda,\phi,h_B,\Psi) \cdot \cos\phi$$

$$f_x(\lambda,\phi,h_B,\theta) = \tan(\theta + \pi/2 - \alpha_D) = 1 + \tan\alpha_D \cdot \tan\theta)/(\tan\alpha_D - \tan\theta)$$

$$L = R_T \cdot \sin GCA$$

$$d_{Alt} = 2 \cdot R_T \cdot \sin^2\left(\frac{GCA}{2}\right)$$

$$= R_T \cdot (1 - \cos(GCA))$$

$$\tan\alpha_D = g_x(\lambda, \phi, h_B)$$

$$= \frac{L}{d_{Alt} + \Delta Alt}$$

$$= \frac{R_T \cdot \sin(GCA)}{R_T \cdot (1 - \cos(GCA)) + \Delta Alt}$$

$$= \frac{R_T \cdot \sin(GCA)}{R_E + h_B - R_T \cdot \cos(GCA)}$$

Figure 4:
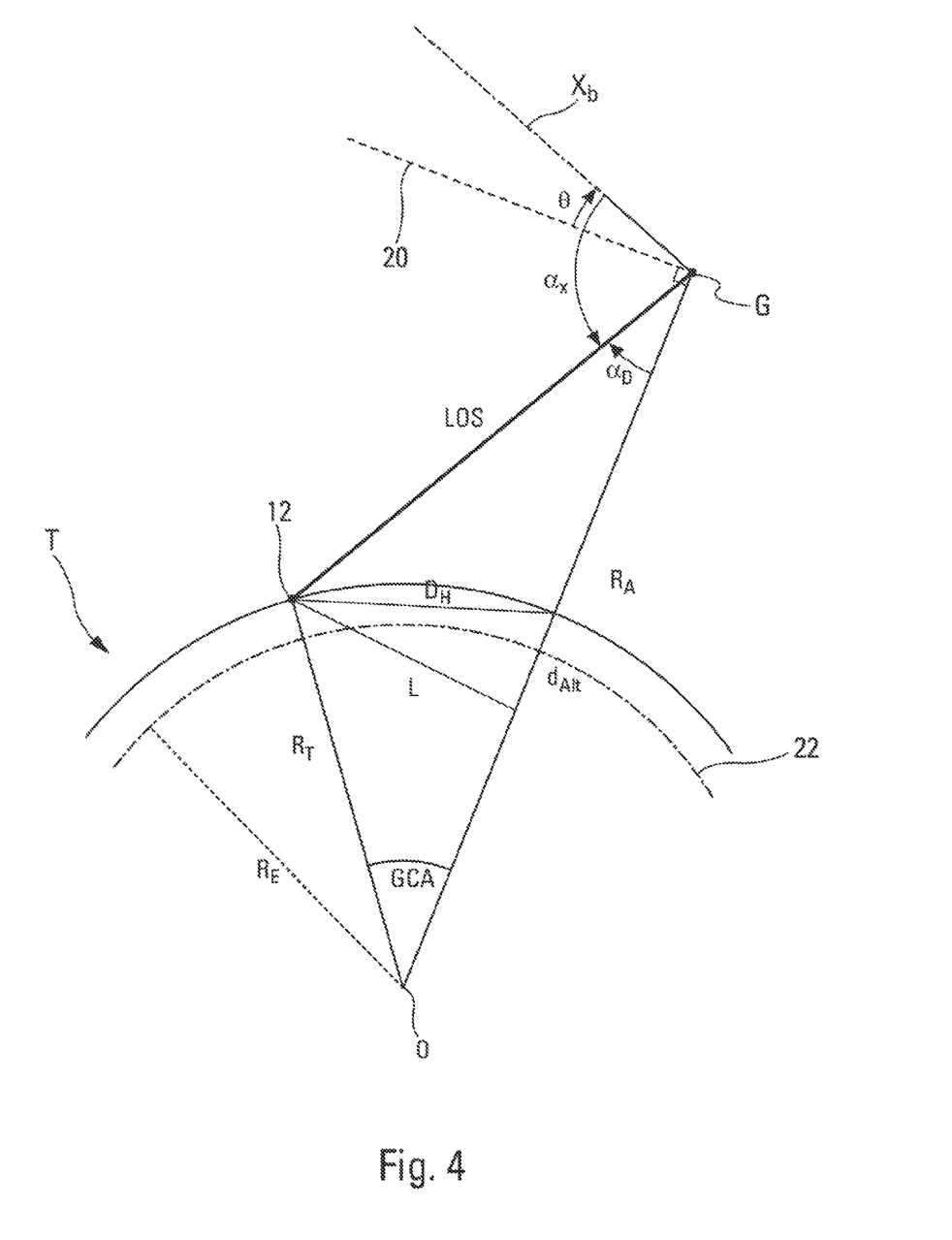

Reference is made for the previous processing operations to FIG. 4 which illustrates the observation model for the vertical optical angular measurements. In this FIG. 4 have been represented in particular a horizontal 20 (in conjunction with the center of mass G of the aircraft AC) and an ellipsoid 22.

It is known that half the versed sine ("haversine") of an angle is defined by:

$$\text{haver sin } e(x) = \sin^2(x/2) = (1 - \cos(x))/2$$

Half the versed sine ("haversine") of the great circle angle GCA is:

$$\text{haver sin } e(CGA) = \text{haver sin } e(\Delta\lambda - \Delta\phi) + \sin\Delta\lambda \cdot \sin\Delta\phi \cdot \text{haver sin } e(\pi/2) = (1 - \cos\Delta\lambda \cdot \cos\Delta\phi)/2$$

The great circle angle GCA is:

$$GCA = k(\lambda, \phi)$$

$$= 2 \cdot \arcsin\left(\sqrt{\left(\frac{1 - \cos\Delta\lambda \cdot \cos\Delta\phi}{2}\right)}\right)$$

$$= \arccos(\cos\Delta\lambda \cdot \cos\Delta\phi)$$

$$f_y(\lambda, \phi, h_B, \psi) = \tan(\alpha_N - \psi)$$

$$= \frac{\tan\alpha_N - \tan\psi}{1 + \tan\alpha_N \cdot \tan\psi}$$

$$d_{lat} = 2 \cdot R_T \cdot \sin\left(\frac{\Delta\lambda}{2}\right)$$

$$d_{long} = 2 \cdot R_T \cdot \sin\left(\frac{\Delta\phi}{2}\right)$$

$$\tan\alpha_N = g_y(\lambda, \phi)$$

$$= \frac{d_{long}}{d_{lat}}$$

$$= \frac{\sin\left(\frac{\Delta\phi}{2}\right)}{\sin\left(\frac{\Delta\lambda}{2}\right)}$$

Figure 5:
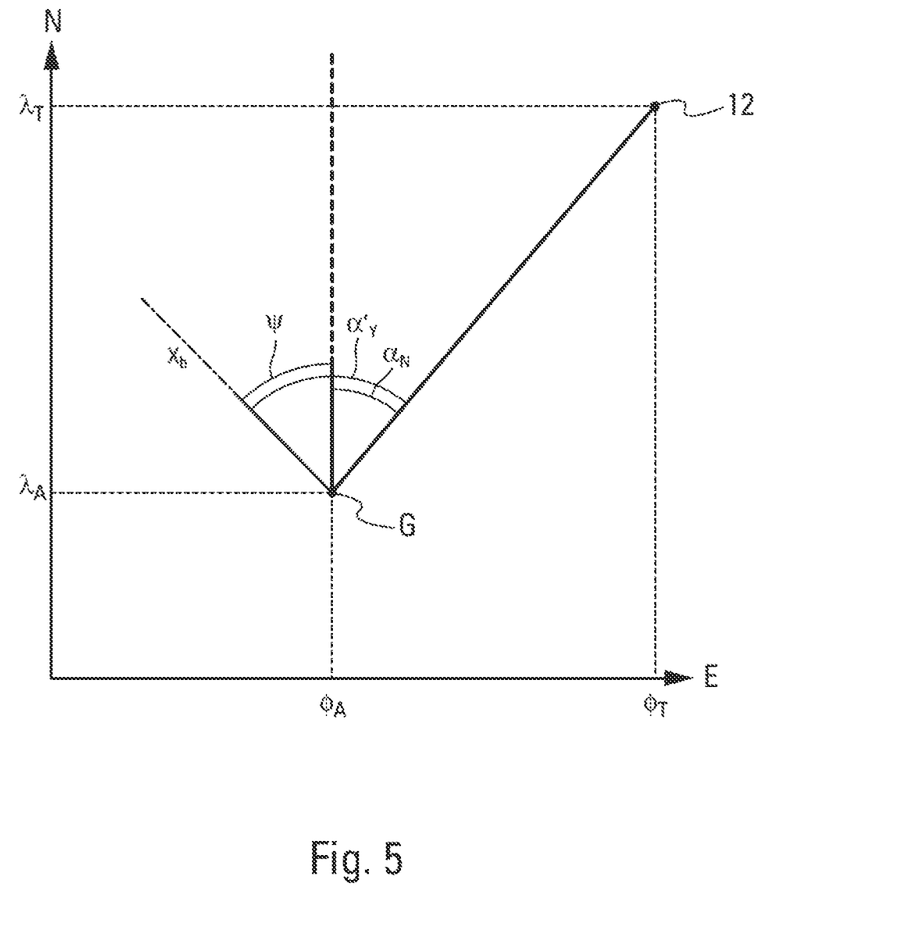

Reference is made for the previous processing operations to FIG. 5 which illustrates the observation model for the horizontal angular measurements. In this FIG. 5 has been represented in particular a graph defined with respect to East E and to North N.

The functions which describe the observation function are:

$$h_1(x, y, z) = x \cdot \cos z + y \cdot \sin z$$

$$h_2(x, y, z) = -x \cdot \sin z + y \cdot \cos z$$

$$f_x(x, y) = \frac{1 + x \cdot y}{x - y}$$

$$f_y(x, y) = \frac{x - y}{1 + x \cdot y}$$

$$g_x(x, y) = \frac{R_T \cdot \sin x}{R_E + y - R_T \cdot \cos x}$$

$$g_y(x, y) = \frac{\sin\left(\frac{x - \phi_T}{2}\right)}{\sin\left(\frac{y - \lambda_T}{2}\right)}$$

$$k(x, y) = 2 \cdot \arcsin\left(\sqrt{\left(\frac{1 - \cos(x - \lambda_T) \cdot \cos(y - \phi_T)}{2}\right)}\right)$$

$$= \arccos(\cos(x - \lambda_T) \cdot \cos(y - \phi_T))$$

The linearized observation matrix $H_{video}$ is:

$$H^i_{video} = \begin{bmatrix} \frac{\partial h^i}{\partial \theta_x} & \frac{\partial h^i}{\partial \theta_y} & \frac{\partial h^i}{\partial h_B} & \frac{\partial h^i}{\partial \phi_x} & \frac{\partial h^i}{\partial \phi_y} & \frac{\partial h^i}{\partial \phi_z} & 0 & \dots & 0 \end{bmatrix}$$

$$\frac{\partial h^i}{\partial \theta_x} = \frac{\partial h^i}{\partial f_x} \times \frac{\partial f_x}{\partial g_x} \times \frac{\partial g_x}{\partial k} \times \left(\frac{\partial k}{\partial \lambda} \times \frac{\partial \lambda}{\partial \theta_x} + \frac{\partial k}{\partial \phi} \times \frac{\partial \phi}{\partial \theta_x}\right) +$$

-continued $$\frac{\partial h^i}{\partial f_y} \times \frac{\partial f_y}{\partial g_y} \times \left(\frac{\partial g_y}{\partial \lambda} \times \frac{\partial \lambda}{\partial \theta_x} + \frac{\partial g_y}{\partial \phi} \times \frac{\partial \phi}{\partial \theta_x}\right)$$

$$\frac{\partial h^i}{\partial \theta_y} = \frac{\partial h^i}{\partial f_x} \times \frac{\partial f_x}{\partial g_x} \times \frac{\partial g_x}{\partial k} \times \left(\frac{\partial k}{\partial \lambda} \times \frac{\partial \lambda}{\partial \theta_y} + \frac{\partial k}{\partial \phi} \times \frac{\partial \phi}{\partial \theta_y}\right) +$$

$$\frac{\partial h^i}{\partial f_y} \times \frac{\partial f_y}{\partial g_y} \times \left(\frac{\partial g_y}{\partial \lambda} \times \frac{\partial \lambda}{\partial \theta_y} + \frac{\partial g_y}{\partial \phi} \times \frac{\partial \phi}{\partial \theta_y}\right)$$

$$\frac{\partial h^i}{\partial h_B} = \frac{\partial h^i}{\partial f_x} \times \frac{\partial f_x}{\partial g_x} \times \frac{\partial g_x}{h_B}$$

$$\frac{\partial h^i}{\partial \phi_x} = \frac{\partial h^i}{\partial f_x} \times \frac{\partial f_x}{\partial \theta} \times \frac{\partial \theta}{\partial \phi_x} + \frac{\partial h^i}{\partial \varphi} \times \frac{\partial \varphi}{\partial \phi_x}$$

$$\frac{\partial h^i}{\partial \phi_y} = \frac{\partial h^i}{\partial f_x} \times \frac{\partial f_x}{\partial \theta} \times \frac{\partial \theta}{\partial \phi_y} + \frac{\partial h^i}{\partial \varphi} \times \frac{\partial \varphi}{\partial \phi_y}$$

$$\frac{\partial h^i}{\partial \phi_z} = \frac{\partial h^i}{\partial f_x} \times \frac{\partial f_x}{\partial \theta} \times \frac{\partial \theta}{\partial \phi_z} + \frac{\partial h^i}{\partial f_y} \times \frac{\partial f_y}{\partial \psi} \times \frac{\partial \psi}{\partial \phi_z}$$

$$\frac{\partial h^i}{\partial (f_x, f_y)} = \begin{bmatrix} \cos(\varphi) & \sin(\varphi) \\ -\sin(\varphi) & \cos(\varphi) \end{bmatrix}$$

$$\frac{\partial h^i}{\partial \varphi} = \begin{bmatrix} -f_x \cdot \sin(\varphi) + f_y \cdot \cos(\varphi) \\ -f_x \cdot \cos(\varphi) - f_y \cdot \sin(\varphi) \end{bmatrix}$$

$$\frac{\partial f_x}{\partial g_x} = \frac{1 + \tan^2(\theta)}{(\tan(\theta) - g_x)^2}$$

$$\frac{\partial f_x}{\partial \tan(\theta)} = -\frac{1 + g_x^2}{(\tan(\theta) - g_x)^2}$$

$$\frac{\partial f_x}{\partial \theta} = \frac{\partial f_x}{\partial \tan(\theta)} \times \frac{\partial \tan(\theta)}{\partial \theta}$$

$$\frac{\partial \tan(\theta)}{\partial \theta} = 1 + \tan^2(\theta) = \frac{1}{\cos^2(\theta)}$$

$$\frac{\partial f_y}{\partial g_y} = \frac{1 + \tan^2(\psi)}{(1 + \tan(\psi) \cdot g_y)^2}$$

$$\frac{\partial f_y}{\partial \tan(\psi)} = -\frac{1 + g_y^2}{(1 + \tan(\psi) \cdot g_y)^2}$$

$$\frac{\partial f_y}{\partial \psi} = \frac{\partial f_y}{\partial \tan(\psi)} \times \frac{\partial \tan(\psi)}{\partial \psi}$$

$$\frac{\partial \tan(\psi)}{\partial \psi} = 1 + \tan^2(\psi) = \frac{1}{\cos^2(\psi)}$$

$$\frac{\partial g_x}{\partial k} = \frac{R_C \cdot (R_E + h_B) \cdot \cos w - R_C^2}{((R_E + h_B) - R_T \cdot \cos w)^2}$$

$$\frac{\partial g_x}{\partial h_B} = -\frac{R_T \cdot \sin w}{((R_E + h_B) - R_T \cdot \cos w)^2}$$

$$\frac{\partial g_y}{\partial \lambda} = -\frac{\cos\left(\frac{\Delta\lambda}{2}\right) \cdot \sin\left(\frac{\Delta\phi}{2}\right)}{2 \cdot \sin^2\left(\frac{\Delta\lambda}{2}\right)}$$

$$= -\frac{g_y}{2 \cdot \tan\left(\frac{\Delta\lambda}{2}\right)}$$

$$\frac{\partial g_y}{\partial \phi} = \frac{1}{2} \cdot \frac{\cos\left(\frac{\Delta\phi}{2}\right)}{\sin\left(\frac{\Delta\lambda}{2}\right)}$$

The partial derivatives of k with respect to $\lambda$ and to $\phi$ are:

$$\frac{\partial k}{\partial \lambda} = \frac{\sin(\Delta\lambda) \cdot \cos(\Delta\phi)}{\sqrt{1 - \cos^2(\Delta\lambda) \cdot \cos^2(\Delta\phi)}} = \frac{\sin(\Delta\lambda) \cdot \cos(\Delta\phi)}{\sin(k)}$$

$$\frac{\partial k}{\partial \phi} = \frac{\cos(\Delta\lambda) \cdot \sin(\Delta\phi)}{\sin(k)}$$

$$\frac{\partial (\lambda, \phi)}{\partial (\theta_x, \theta_y)} = \begin{bmatrix} -\sin w & -\cos w \\ \frac{\cos w}{\cos \lambda} & -\frac{\sin w}{\cos \lambda} \end{bmatrix}$$

$$\frac{\partial (\varphi, \theta)}{\partial (\phi_x, \phi_y)} = \begin{bmatrix} \cos w & -\sin w \\ \sin w & \cos w \end{bmatrix}$$

On the basis of the previous data we obtain the global observation matrix H which corresponds, within the framework of the present invention, to:

$$H = \begin{bmatrix} H_{GPS} \\ H_{video} \end{bmatrix}$$

Moreover, concerning the measurement noise covariance matrix:
the GPS pseudo-distance measurement noise covariance matrix $R_{GPS}$ is:

$$R_{GPS} = \sigma_{UERE}^2 \cdot I_{nb_{pseudorange}}$$

the video measurement noise covariance matrix $R_{video}$ is:

$$R_{video} = \sigma_{video}^2 \cdot I_{2 \times nb_{target}}$$

and finally, the global noise covariance matrix R is:

$$R = \begin{bmatrix} R_{GPS} & 0 \\ 0 & R_{video} \end{bmatrix}$$

The device 1, such as described hereinabove, integrates video data, thereby making it possible to improve the precision of the navigation parameters determined with the aid of the extended Kalman filter 7 (adapted in an appropriate manner, as specified hereinabove) of the data processing unit 6 of the device 1. The device 1 thus affords an aid to the navigation of the aircraft AC, especially during the approach and/or landing, being for example integrated into a navigation system of the aircraft AC.

Moreover, the integration of the additional visual measurements (video data), derived from a video processing operation of at least one digital video camera 11, makes it possible to obtain a navigation device 1 and/or system, which are autonomous (and which do not require, in particular, any ground stations).

The invention claimed is:

1. A method for determining navigation parameters of an aircraft during a landing phase, said method comprising steps implemented in an automatic and repetitive manner and entailing:
in a first step, determining on the aircraft:
by a first data generating unit, first data corresponding to current navigation data of the aircraft, arising from a satellite navigation system;
by a second data generating unit, second data corresponding to current inertial data of the aircraft; and
video data corresponding to current data relating to at least one characteristic point on the Earth, whose coordinates are known and contained in a database, said video data being generated by at least one digital video camera arranged on the aircraft and observing said characteristic point, the video data comprise the following angular measurements:
  a first measurement, at a focal point of the video camera, of a first angle between an axis of an aircraft frame and a projection on a vertical plane of a line of sight of the video camera observing said characteristic point; and
  a second measurement, at a focal point of the video camera, of a second angle between the axis of the aircraft frame and a projection on a horizontal plane of the line of sight of the video camera observing said characteristic point; and
in a second step, computing the navigation parameters on the basis of said first and second data and of said video data by a data processing unit, with the aid of an extended Kalman filter, said navigation parameters comprising at least some of the following data:
a position parameter of the aircraft;
a velocity parameter of the aircraft;
an attitude parameter of the aircraft; and
at least one parameter relating to an error of at least one sensor,
wherein the second step takes into account an observation matrix comprising a first observation matrix relating to said first data and a second observation matrix relating to said video data, and said second observation matrix comprises a tangent of the first measurement and a tangent of the second measurement which are defined with respect to the following parameters:
  the latitude, the longitude and the height with respect to the ground of the aircraft; and
  the angles of roll, of pitch and of yaw of the aircraft.

2. The method as claimed in claim 1, wherein said characteristic point on the Earth represents a particular point of a runway scheduled for a landing of the aircraft during the landing phase.

3. A device for determining navigation parameters of an aircraft during a landing phase, said device comprising:
  a first data generating unit configured to determine first data corresponding to current navigation data of the aircraft, arising from a satellite navigation system;
  a second data generating unit configured to determine second data corresponding to current inertial data of the aircraft;
  a video system comprising at least one digital video camera arranged on the aircraft, the digital video camera being configured to generate on the aircraft current video data relating to at least one characteristic point on the Earth, whose coordinates are known, the video data comprise the following angular measurements:
    a first measurement, at a focal point of the video camera, of a first angle between an axis of an aircraft frame and a projection on a vertical plane of a line of sight of the video camera observing said characteristic point; and
    a second measurement, at a focal point of the video camera, of a second angle between the axis of the aircraft frame and a projection on a horizontal plane of the line of sight of the video camera observing said characteristic point;
  a database containing the coordinates;
  a data processing unit comprising an extended Kalman filter and configured to determine the navigation parameters on the basis of said first and second data and of said video data, said navigation parameters comprising at least some of the following data:
a position parameter of the aircraft;
a velocity parameter of the aircraft;
an attitude parameter of the aircraft; and
at least one parameter relating to an error of at least one sensor,
wherein the navigation parameters are determined taking into account an observation matrix comprising a first observation matrix relating to said first data and a second observation matrix relating to said video data, and said second observation matrix comprises a tangent of the first measurement and a tangent of the second measurement which are defined with respect to the following parameters:
  the latitude, the longitude and the height with respect to the ground of the aircraft; and
  the angles of roll, of pitch and of yaw of the aircraft.

4. The device as claimed in claim 3, further comprising user means of navigation parameters determined by the data processing unit.

5. An aircraft navigation system, further comprising a device for determining navigation parameters of an aircraft during a landing phase, said device comprising:
  a first data generating unit configured to determine first data corresponding to current navigation data of the aircraft, arising from a satellite navigation system;
  a second data generating unit configured to determine second data corresponding to current inertial data of the aircraft;
    a video system comprising at least one digital video camera arranged on the aircraft, the digital video camera being configured to generate on the aircraft current video data relating to at least one characteristic point on the Earth, whose coordinates are known, the video data comprise the following angular measurements:
      a first measurement, at a focal point of the video camera, of a first angle between an axis of an aircraft frame and a projection on a vertical plane of a line of sight of the video camera observing said characteristic point; and
      a second measurement, at a focal point of the video camera, of a second angle between the axis of the aircraft frame and a projection on a horizontal plane of the line of sight of the video camera observing said characteristic point;
  a database containing the coordinates;
  a data processing unit comprising an extended Kalman filter and configured to determine the navigation parameters on the basis of said first and second data and of said video data, said navigation parameters comprising at least some of the following data:
a position parameter of the aircraft;
a velocity parameter of the aircraft;
an attitude parameter of the aircraft; and
at least one parameter relating to an error of at least one sensor,
wherein the navigation parameters are determined taking into account an observation matrix comprising a first observation matrix relating to said first data and a second observation matrix relating to said video data, and said second observation matrix comprises a tangent of the first measurement and a tangent of the second measurement which are defined with respect to the following parameters:
  the latitude, the longitude and the height with respect to the ground of the aircraft; and
  the angles of roll, of pitch and of yaw of the aircraft.

6. An aircraft comprising a device for determining navigation parameters of an aircraft during a landing phase, said device comprising:
- a first data generating unit configured to determine first data corresponding to current navigation data of the aircraft, arising from a satellite navigation system;
- a second data generating unit configured to determine second data corresponding to current inertial data of the aircraft;
  - a video system comprising at least one digital video camera arranged on the aircraft, the digital video camera being configured to generate on the aircraft current video data relating to at least one characteristic point on the Earth, whose coordinates are known, the video data comprise the following angular measurements:
    - a first measurement, at a focal point of the video camera, of a first angle between an axis of an aircraft frame and a projection on a vertical plane of a line of sight of the video camera observing said characteristic point; and
    - a second measurement, at a focal point of the video camera, of a second angle between the axis of the aircraft frame and a projection on a horizontal plane of the line of sight of the video camera observing said characteristic point;
- a database containing the coordinates;
- a data processing unit comprising an extended Kalman filter and configured to determine the navigation parameters on the basis of said first and second data and of said video data, said navigation parameters comprising at least some of the following data:
- a position parameter of the aircraft;
- a velocity parameter of the aircraft;
- an attitude parameter of the aircraft; and
- at least one parameter relating to an error of at least one sensor,
  wherein the navigation parameters are determined taking into account an observation matrix comprising a first observation matrix relating to said first data and a second observation matrix relating to said video data, and said second observation matrix comprises a tangent of the first measurement and a tangent of the second measurement which are defined with respect to the following parameters:
  - the latitude, the longitude and the height with respect to the ground of the aircraft; and
  - the angles of roll, of pitch and of yaw of the aircraft.

* * * * *